(12) United States Patent
Collins

(10) Patent No.: US 7,806,769 B2
(45) Date of Patent: Oct. 5, 2010

(54) TOUCHSCREEN AMUSEMENT DEVICE

(75) Inventor: Jeffrey S. Collins, Chalfont, PA (US)

(73) Assignee: AMI Entertainment Network, Inc., Bristol, PA (US)

(*) Notice: Subject to any disclaimer, the term of this patent is extended or adjusted under 35 U.S.C. 154(b) by 875 days.

(21) Appl. No.: 10/663,030

(22) Filed: Sep. 15, 2003

(65) Prior Publication Data
US 2005/0024343 A1 Feb. 3, 2005

Related U.S. Application Data

(60) Provisional application No. 60/485,237, filed on Jul. 7, 2003.

(51) Int. Cl.
*A63F 9/24* (2006.01)

(52) U.S. Cl. .......................... 463/46; 463/20

(58) Field of Classification Search .................. 463/29, 463/16, 37, 20, 46; 248/397; D14/374
See application file for complete search history.

(56) References Cited

U.S. PATENT DOCUMENTS

| | | | | |
|---|---|---|---|---|
| 4,669,694 | A * | 6/1987 | Malick | 248/397 |
| 5,342,047 | A * | 8/1994 | Heidel et al. | 463/29 |
| 5,668,570 | A * | 9/1997 | Ditzik | 345/173 |
| 6,015,344 | A | 1/2000 | Kelly et al. | |
| 6,081,420 | A * | 6/2000 | Kim et al. | 361/681 |
| 6,233,139 | B1 * | 5/2001 | Hamon | 361/681 |
| 6,381,125 | B1 * | 4/2002 | Mizoguchi et al. | 361/682 |
| 6,514,145 | B1 * | 2/2003 | Kawabata et al. | 463/46 |
| D478,088 | S * | 8/2003 | Hamouz | D14/451 |
| 6,702,238 | B1 * | 3/2004 | Wang | 248/125.8 |
| 7,180,731 | B2 * | 2/2007 | Titzler et al. | 361/681 |
| D542,296 | S * | 5/2007 | Bockheim et al. | D14/451 |
| 7,237,755 | B2 * | 7/2007 | Cho et al. | 248/274.1 |
| 7,274,555 | B2 * | 9/2007 | Kim et al. | 361/681 |
| 7,304,838 | B2 * | 12/2007 | Kumano et al. | 361/681 |
| 2003/0060270 | A1 * | 3/2003 | Binkley et al. | 463/20 |
| 2004/0023708 | A1 * | 2/2004 | Kaminkow et al. | 463/16 |

FOREIGN PATENT DOCUMENTS

DE  41 21 491 A1  1/1993

OTHER PUBLICATIONS

European Search Report, Jul. 27, 2009, pp. 1-4.*

* cited by examiner

*Primary Examiner*—Peter DungBa Vo
*Assistant Examiner*—Omkar Deodhar
(74) *Attorney, Agent, or Firm*—Panitch Schwarze Belisario & Nadel LLP

(57) ABSTRACT

A touchscreen amusement device includes a display housing, a touchscreen display disposed within the display housing and an amusement device controller disposed within the display housing. The amusement device controller is coupled to the touchscreen display and is configured to display and control at least one of electronic games, music, video or multimedia applications using the touchscreen display. The touchscreen amusement device also includes a rear-mounted support stand configured to receive and support the display housing.

13 Claims, 6 Drawing Sheets

TOUCHSCREEN AMUSEMENT DEVICE

CROSS REFERENCE TO RELATED APPLICATIONS

This Application claims the benefit of U.S. Provisional Patent Application No. 60/485,237 filed Jul. 7, 2003, entitled "Touchscreen Amusement Device," the entire contents of which is incorporated by reference herein.

BACKGROUND OF THE INVENTION

The present invention relates generally to a touchscreen amusement device, and more particularly, to a touchscreen amusement device having a touchscreen display and a controller integrally mounted within a display housing and having a rear-mounted support stand.

Touchscreen amusement devices for playing electronic games, music, video and multimedia are generally well known in the art. Most prior art touchscreen amusement devices include a cathode ray tube (CRT) touchscreen monitor, a controller board, a sound system and a revenue device or devices. The overall size of the CRT touchscreen necessitated cabinets that were at least as deep as the CRT which were on the order of 16-36" deep depending on the screen-size of the CRT touchscreen. Thus, the cabinets for the prior art touchscreen amusement devices were bulky and box-like in appearance for both countertop cabinets and free-standing floor cabinets (upright and table versions).

One prior art touchscreen amusement device, the Vibe™, commercially available from Merit Industries, Inc., Bensalem, Pa., incorporates a liquid crystal display (LCD) flatscreen touchscreen display to reduce the overall footprint of the cabinet. The revenue system for the Vibe™ is integral with the LCD flatscreen display cabinet. However, the Vibe™ requires a separate cabinet for housing the amusement device controller which is connected to the LCD flatscreen display cabinet by a bundle of cables in order to permit remote mounting of the amusement device controller from the combined LCD flatscreen display and revenue system housing.

It would be desirable to provide a touchscreen amusement device having a touchscreen and a controller integrally mounted within a display housing and having a rear-mounted support stand. It would also be desirable to provide a touchscreen amusement having a touchscreen and a controller integrally mounted within a display housing which is selectively detachable from a revenue system for remote mounting.

BRIEF SUMMARY OF THE INVENTION

The present invention comprises a touchscreen amusement device that includes a display housing, a touchscreen display disposed within the display housing and an amusement device controller disposed within the display housing. The amusement device controller is coupled to the touchscreen display and is configured to display and control at least one of a electronic games, music, video and multi-media applications using the touchscreen display. The touchscreen amusement device also includes a rear-mounted support stand configured to receive and support the display housing.

In yet another aspect, the present invention is a flatscreen touchscreen amusement device including a display housing having a front, a rear, a top edge and a bottom edge. The flatscreen touchscreen amusement device includes a flatscreen touchscreen display disposed within the display housing, a memory storage device disposed within the display housing for storing system control software and at least one of electronic games, music, video and multi-media applications and an amusement device controller disposed within the display housing. The amusement device controller is coupled to the touchscreen display and the memory and is configured to display and control at least one of electronic games, music, video and multi-media applications using the touchscreen display. The flatscreen touchscreen amusement device includes a rear-mounted support stand configured to receive and support the display housing. In varying embodiments, the rear-mounted support stand includes a coin acceptor having a coin acceptance slot located in a top front facing section of the rear-mounted support stand above a top edge of the display housing and/or a paper currency acceptor having a paper currency acceptance slot located in a bottom front facing section of the rear-mounted support stand below the bottom edge of the display housing.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
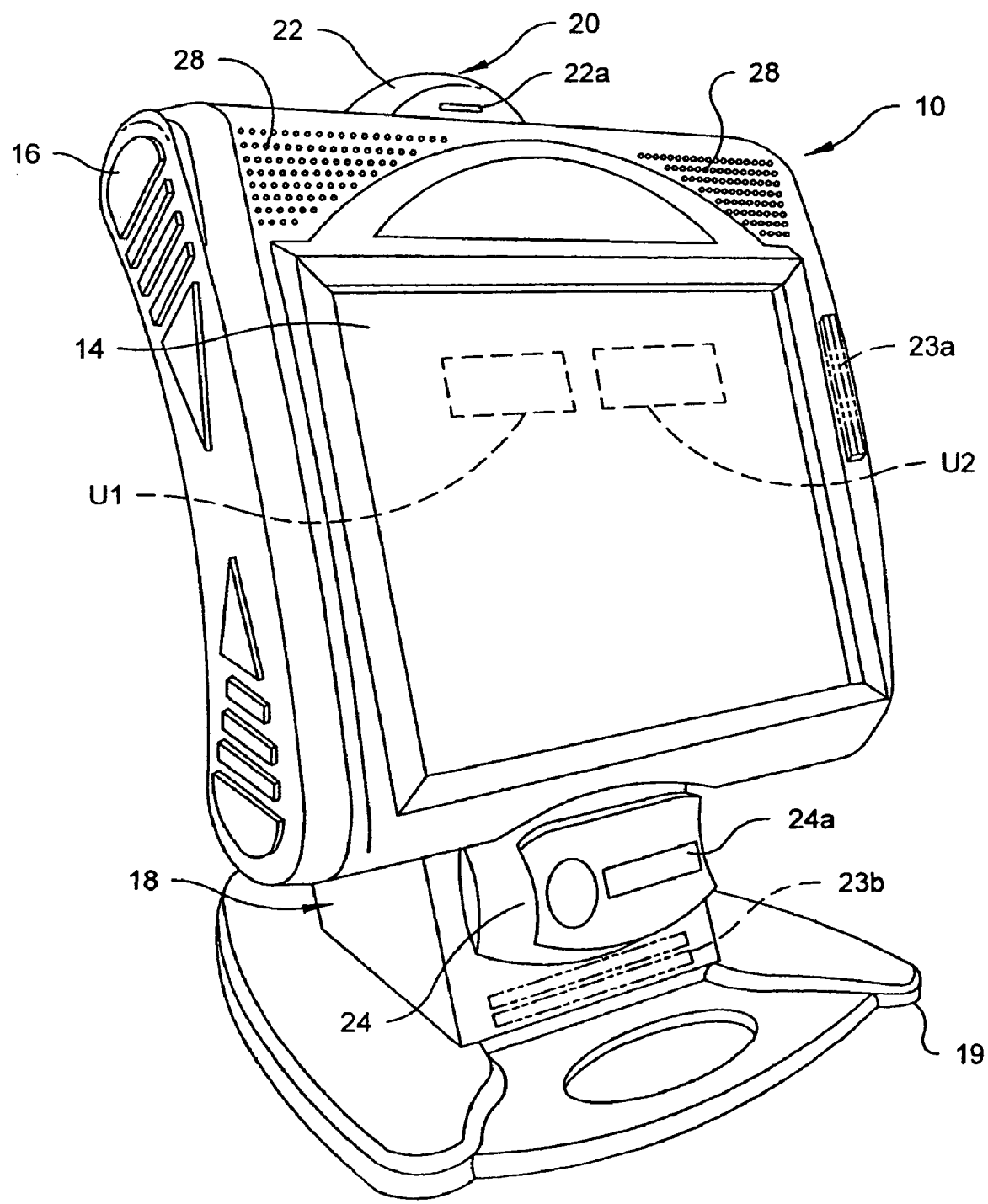
FIG. 1 is a front perspective view of a touchscreen amusement device in accordance with a preferred embodiment of the present invention.
Figure 2:
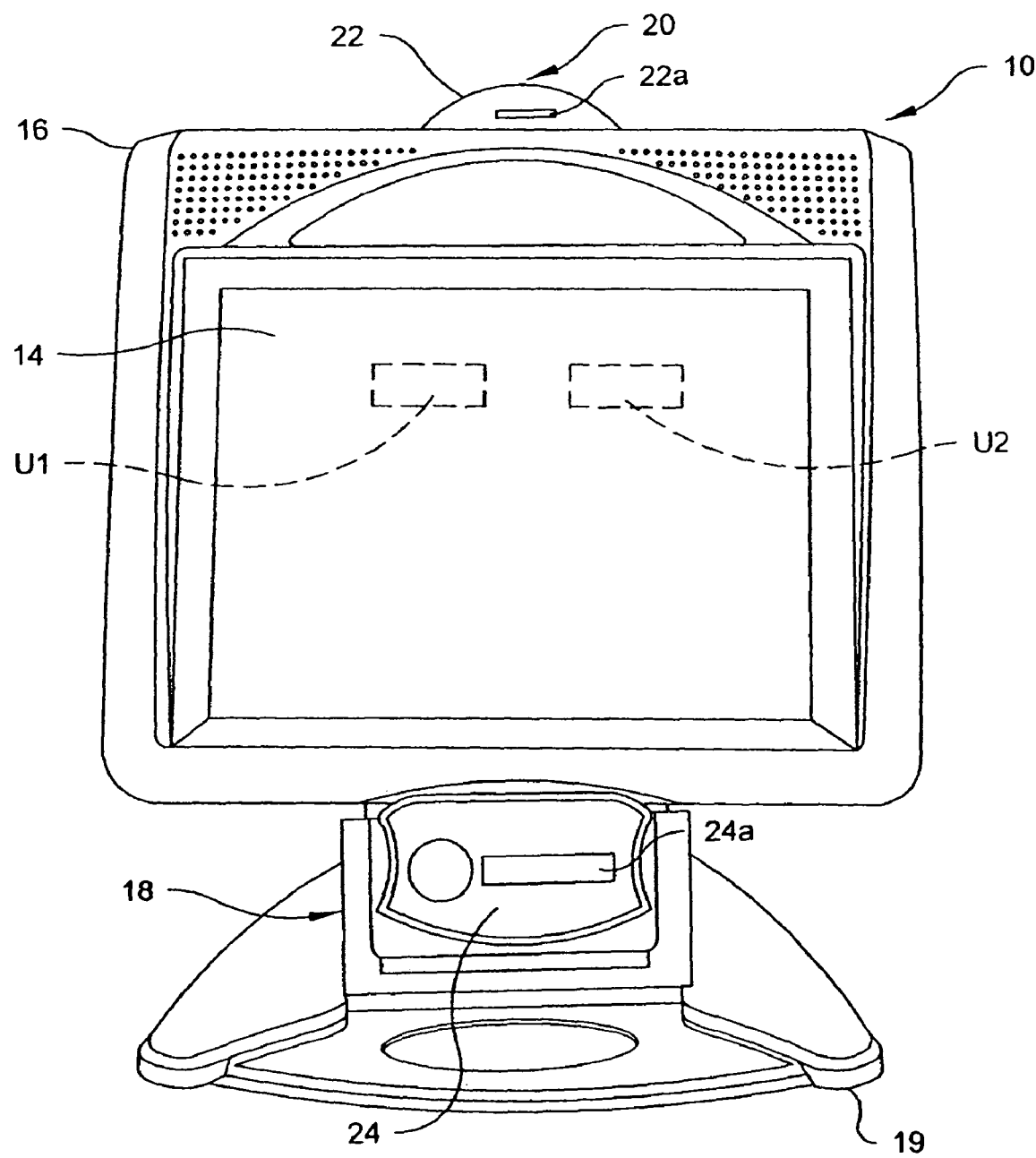
FIG. 2 is a front elevational view of the touchscreen amusement device of FIG. 1.
Figure 3:
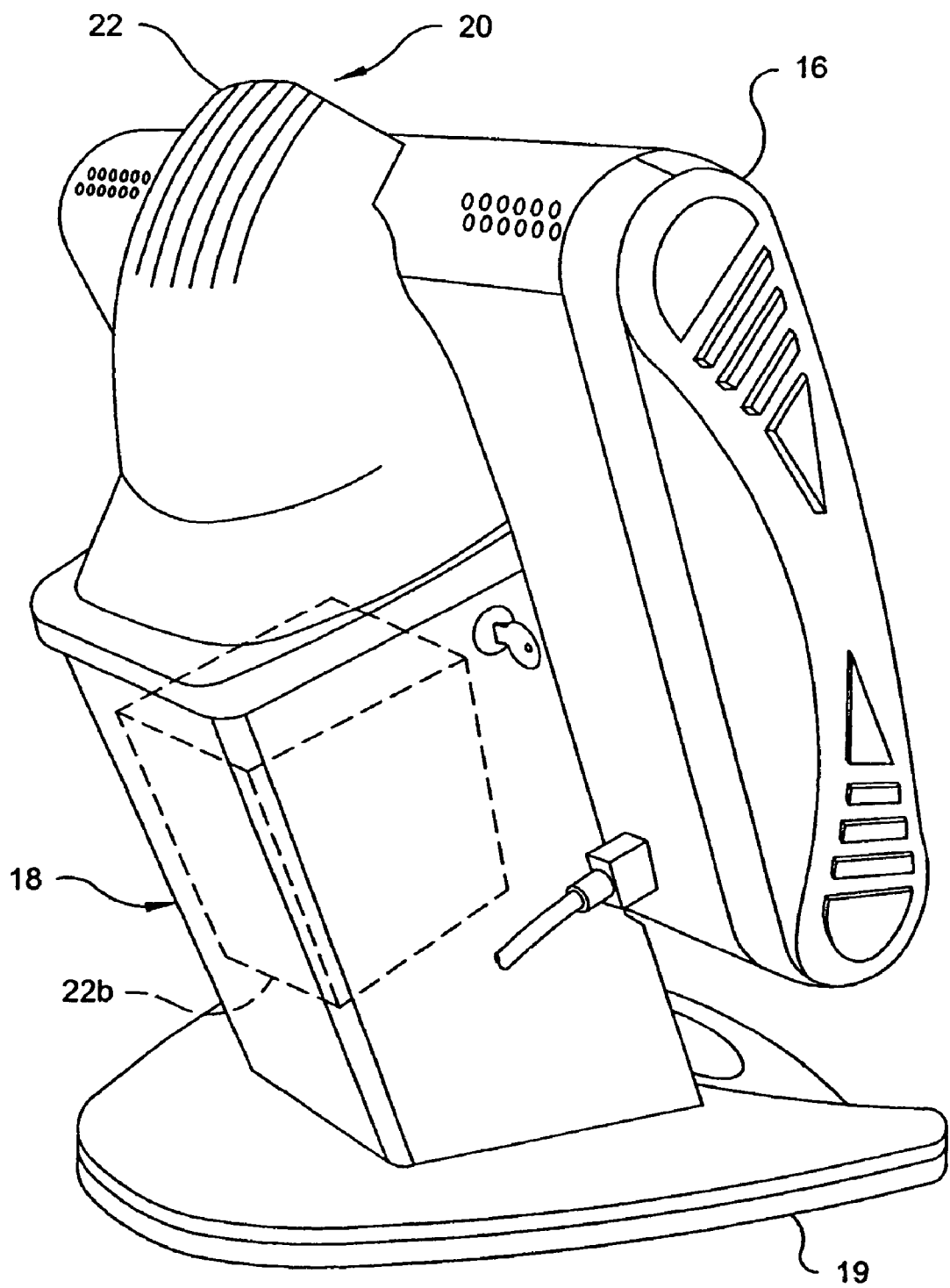
FIG. 3 is a side elevational view of the touchscreen amusement device of FIG. 1.
Figure 4:
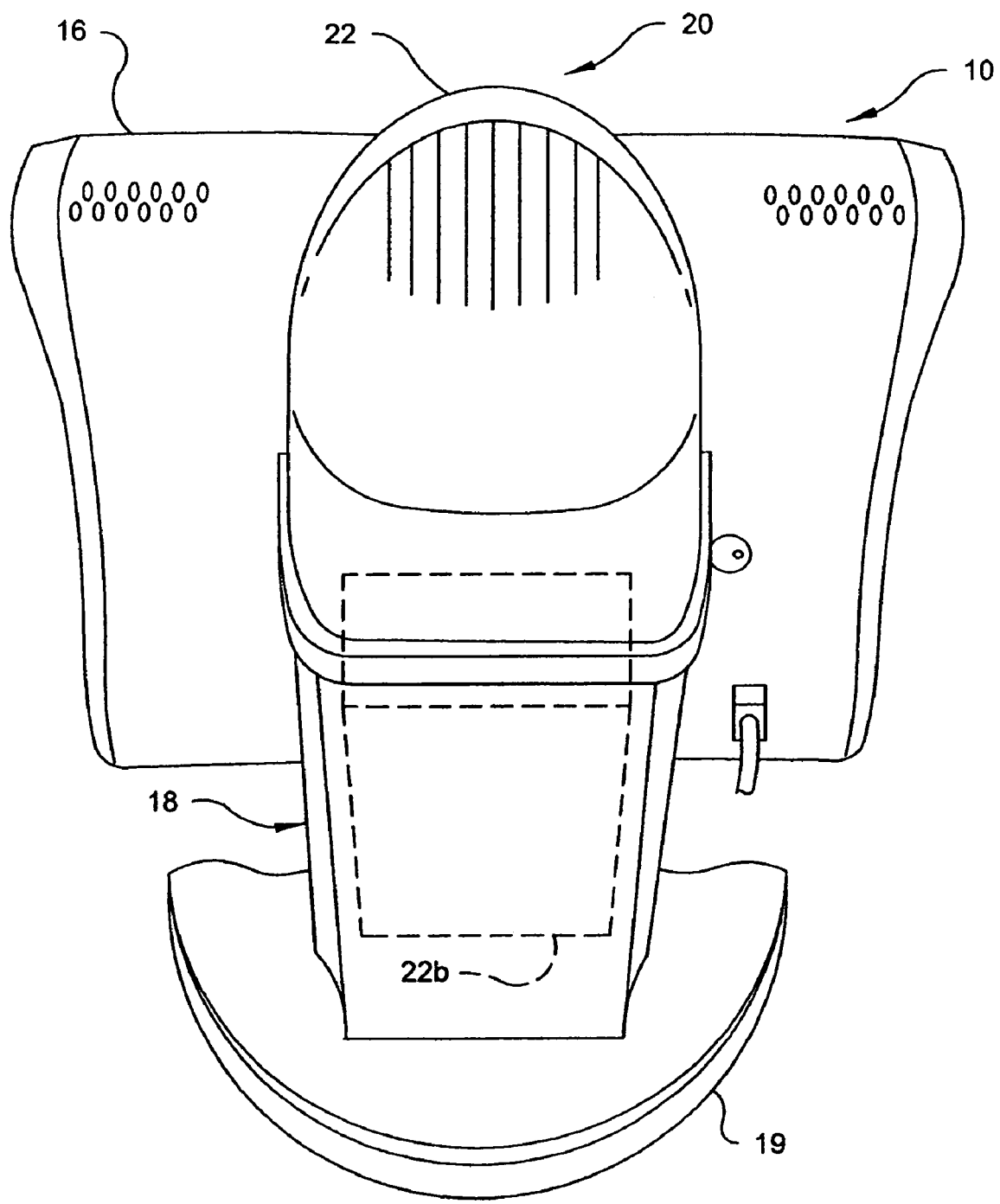
FIG. 4 is a rear elevational view of the touchscreen amusement device of FIG. 1.
Figure 5:
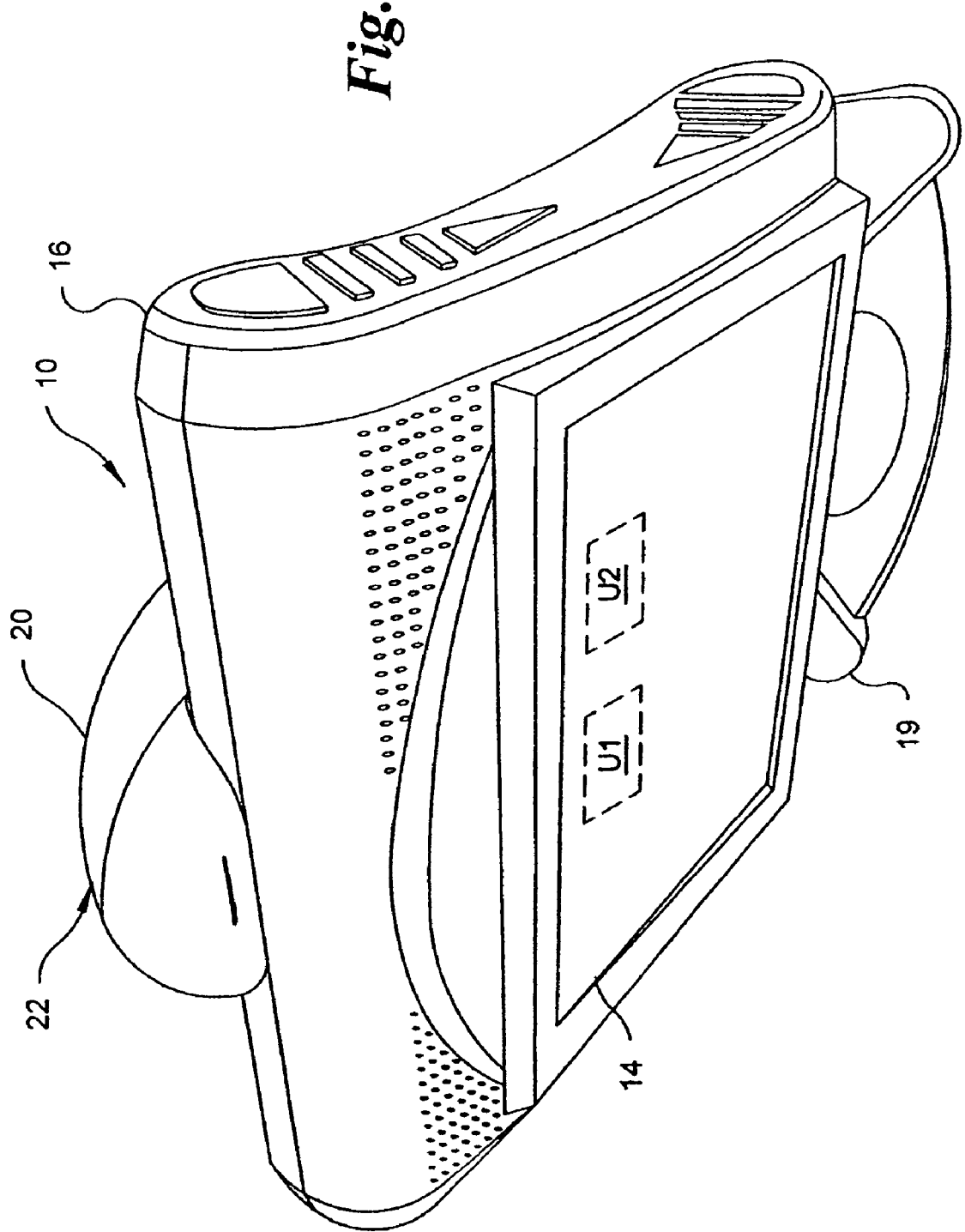
FIG. 5 is a top plan view of the touchscreen amusement device of FIG. 1.

Certain terminology is used in the following description for convenience only and is not limiting. The words "right," "left," "lower" and "upper" designate directions in the drawings to which reference is made. The words "inwardly" and "outwardly" refer to directions toward and away from respectively, the geometric center of the device discussed and designated parts thereof. The terminology includes the words above specifically mentioned, derivatives thereof and words of similar import. Additionally, the word "a" as used in the claims and in the corresponding portions of the specification, means "one or more than one." Further, the terms "coin" or "currency" should not be construed as limiting and can be used herein to mean all forms of coin and paper currency from any country as well as proprietary tokens, game cards, credit cards, debit cards, chits, or other representative forms of credit and/or payment.

Referring to the drawings in detail, there is shown in FIGS. 1-5 a touchscreen amusement device 10 that has a touchscreen display 14 and an amusement device controller U1 which are both integrally mounted within a display housing 16. The amusement device controller U1 is coupled to the touchscreen display 14 and is configured to display and control electronic games, music, video or multi-media applications using the touchscreen display 14. Preferably, the touchscreen display 14 is a flatscreen display (i.e., a flatscreen touchscreen display 14). The touchscreen display 14 may be a liquid crystal display (LCD) touchscreen display, but the touchscreen may be other touchscreen display technologies which provide a reduced depth, flatscreen display.

The touchscreen amusement device 10 also includes a memory storage device U2 disposed within the display housing 16 for storing system control software and at least one of electronic games, music, video and multi-media applications. The memory storage device U2 can be any known memory storage device such as a hard disk drive, a compact disk read only memory (CD-ROM), a DVD/DVD ROM, an optical disk drive, a FLASH read only memory (ROM) or random access memory (RAM) device, an electronically erasable programmable read only memory (EEPROM or EPROM) and the like. The memory storage device U2 may even be integrated with the amusement device controller U1, such as built in FLASH ROM/RAM. The system control software includes programming code for operating the touchscreen 14, counting revenue and/or credits, system functions such as time/date, sound drivers and the like. Electronic games may include action games, strategy games, card games, trivia games and the like. The music and video may be compressed files or analog files as is known in the art.

The touchscreen amusement device 10 also includes a rear-mounted support stand 18. The rear-mounted support stand 18 is configured to receive and support the display housing 16. Preferably, the rear-mounted support stand 18 is configured with a revenue system 20, but need not be. The revenue system 20 includes at least one of a coin acceptor 22, a paper currency acceptor 24 and a card-reader 23a or 23b (phantom on FIG. 1). The rear-mounted support stand 18 is modularly configurable to accept a combination of the revenue devices 22, 23b, 24. When the revenue system 20 is configured with the coin acceptor system 22, a coin bucket 22b (phantom in FIGS. 3-4) is removably mounted to the back portion of the rear-mounted support stand 18. Preferably, the rear-mounted support stand 18 includes both the coin acceptor 22 having a coin acceptance slot 22a located in a top front facing section of the rear-mounted support stand 18 above a top edge of the display housing 16 and a paper currency acceptor 24 having a paper currency acceptance slot 24a located in a bottom front facing section of the rear-mounted support stand 18 below the bottom edge of the display housing 16.

The card reader 23a or 23b may optionally be mounted on either the display housing 16 (i.e., 23a) or on the rear-mounted support stand 18 (i.e., 23b). The card reader 23a or 23b is configured to read at least one of a magnetic stripe, a bar code or a smart-chip, and can be configured to read combinations thereof. For example the card reader 23a or 23b may be able to read both a bank or credit card magnetic stripe (i.e., an American Banking Association or ABA compatible magnetic stripe) and a proprietary magnetic stripe, bar-code or smart chip such as a card for amusement halls, hotels, cruise-ships, resorts, and the like.

The rear-mounted support stand 18 further includes a pedestal base 19 to provide greater stability when the touchscreen amusement device 10 is placed in a free-standing orientation such as on a bar or table (not shown). However, the rear-mounted support stand 18 may be stably placed without a pedestal base 19 as well. Further, the rear-mounted support stand 18 may also be physically secured to a surface using screws, bolts, glue, mounting brackets or the like.

The display housing 16 may also include integral speakers 28 for playing music and sound effects associated with the electronic games, music, videos, and/or multi-media files controlled by the amusement device controller U1. The touchscreen amusement device 10 may also include outputs for remote audio amplification by an external sound system (not shown).

While referred to herein as a rear-mounted support stand 18, the support stand 18 may be mounted at either side or the top or bottom edges of the display housing 16. Furthermore, as shown in the attached FIGS. 1-5, the revenue system 20 and rear-mounted support stand 18 are generally aligned in the middle of the display housing 16 (or about the centerline thereof). Alternatively, the revenue system 20 and rear-mounted support stand 18 may be generally aligned off the centerline of the display housing 16.

Figure 6:
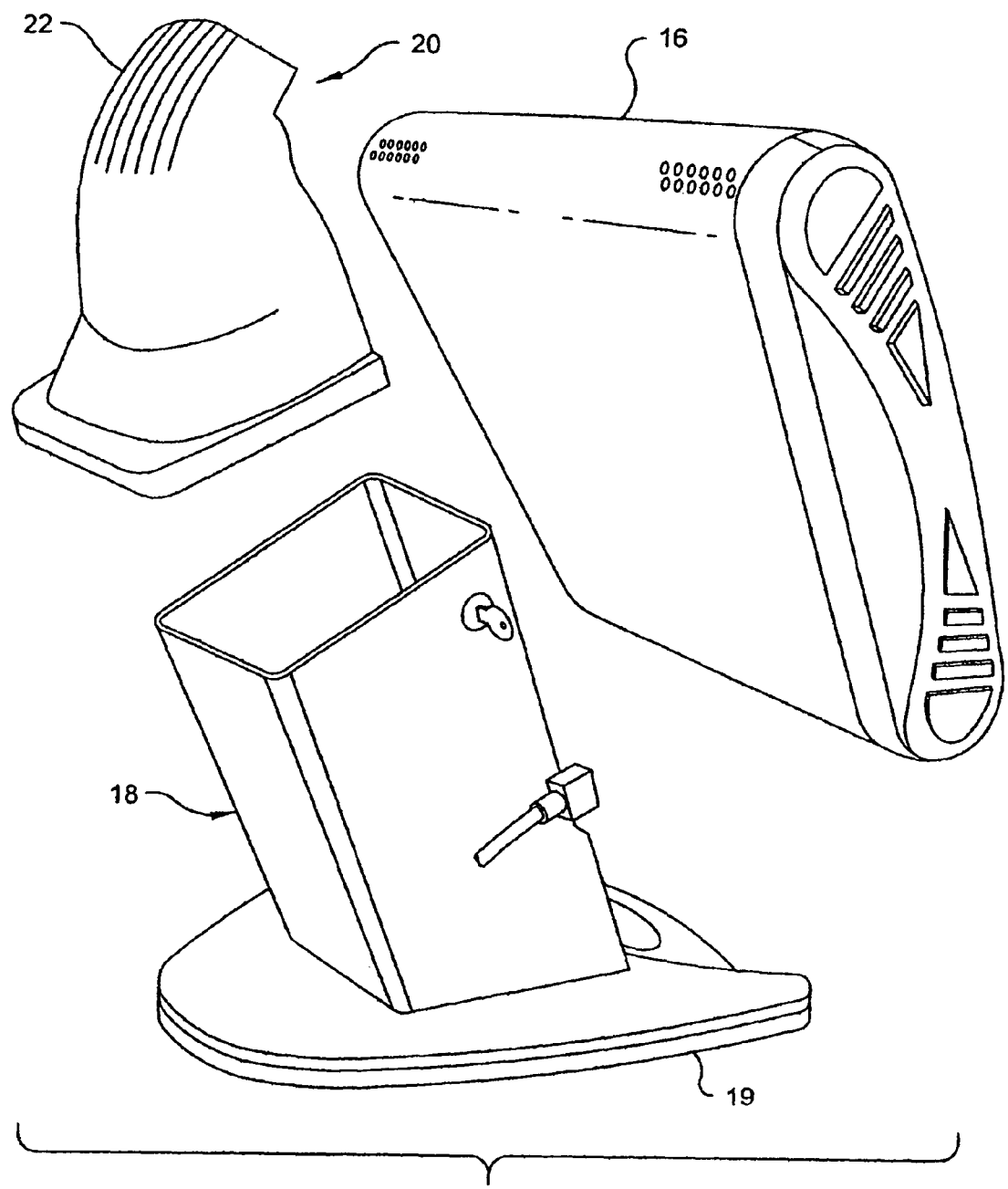
FIG. 6 is a partially exploded view of the touchscreen amusement device of FIG. 1 having a display, stand and coin acceptor selectively detached.

In an alternate embodiment, the display housing 16 is selectively removable from the rear-mounted support stand 18 (FIG. 6). Such a configuration allows for mounting the display housing 16 in an alternative location such as on a wall, on a reduced footprint stand 19 or the like, remote from the coin/money receiving mechanisms such as coin acceptor 22 and bill acceptor 24 and/or a card reader 23a/23b.

In another alternate embodiment, the display housing 16 may be selectively detachable from the revenue system 20 for remote mounting of the display housing 16 from the revenue system 20 (FIG. 6). The revenue system 20 may be remotely mounted even when the display housing 12 is mounted to the rear-mounted support stand 18. Such a configuration allows for a single revenue system 20 which is accessible by a plurality of touchscreen amusement devices 10. The coin acceptor 22 and bill acceptor 24 may take on other shapes, be configured in other arrangements or be mounted in a dedicated housing (not shown) as would be obvious to one skilled in the art.

From the foregoing, it can be seen that the present invention comprises a touchscreen amusement device, and more particularly, a touchscreen amusement device having a flatscreen touchscreen display and a controller integrally mounted within a display housing and having a rear-mounted support stand. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A flatscreen touchscreen table-top amusement device comprising:

a display housing having a front, a rear, a top edge and a bottom edge, the display housing being receivable and supportable by a rear-mounted support stand;

a flatscreen touchscreen display disposed within the display housing, the flatscreen touchscreen display providing a reduced depth flatscreen display;

an amusement device controller disposed within the display housing, the amusement device controller being coupled to the touchscreen display and being configured to display and control at least one of electronic games, music, video and multi-media applications using the touchscreen display; and the rear-mounted support stand configured to receive and support the display housing, the rear mounted support stand configured to receive a revenue system having at least one revenue acceptor portion, the rear mounted support stand and revenue system being generally aligned about a middle of the display housing, at least a portion of the revenue system being located behind the display housing between the top edge and the bottom edge of the display housing, each revenue acceptor portion being simultaneously accessible with the front of the display housing at all times, the display housing having a permanently fixed orientation with respect to the rear-mounted support stand.

2. The touchscreen amusement device of claim 1, wherein the rear-mounted support stand includes a paper currency acceptor.

3. The touchscreen amusement device of claim 2, wherein the paper currency acceptor has an acceptance slot located in a bottom front facing section of the rear-mounted support stand below the bottom edge of the display housing.

4. The touchscreen amusement device of claim 1, wherein the rear-mounted support stand includes a coin acceptor.

5. The touchscreen amusement device of claim 4, wherein the coin acceptor has an acceptance slot located in a top front facing section of the rear-mounted support stand above a top edge of the display housing.

6. The touchscreen amusement device of claim 1, wherein the rear-mounted support stand is coupled to a card reader.

7. The touchscreen amusement device of claim 6, wherein the card reader is located on one of a front facing section of the rear-mounted support stand and the display housing.

8. A flatscreen touchscreen table-top amusement device comprising:
   a display housing having a front, a rear, a top edge and a bottom edge, the display housing being receivable and supportable by a rear-mounted support stand;
   a flatscreen touchscreen display disposed within the display housing, the flatscreen touchscreen display providing a reduced depth flatscreen display;
   a memory storage device disposed within the display housing for storing system control software and at least one of electronic games, music, video and multi-media applications;
   an amusement device controller disposed within the display housing, the amusement device controller being coupled to the touchscreen display and the memory storage device and being configured to display and control at least one of electronic games, music, video and multi-media applications using the touchscreen display; and
   the rear-mounted support stand configured to receive and support the display housing, the rear-mounted support stand including a coin acceptor having a coin acceptance slot located in a top front facing section of the rear-mounted support stand above a top edge of the display housing and a paper currency acceptor having a paper currency acceptance slot located in a bottom front facing section of the rear-mounted support stand below the bottom edge of the display housing, at least a portion of the coin acceptor being located behind the display housing between the top edge and the bottom edge of the display housing, the coin acceptance slot and the currency acceptance slot being simultaneously accessible with the front of the display housing at all times, the display housing having a permanently fixed orientation with respect to the rear-mounted support stand.

9. The touchscreen amusement device of claim 1, wherein the flatscreen touchscreen display is a liquid crystal display.

10. The touchscreen amusement device of claim 8, wherein the flatscreen touchscreen display is a liquid crystal display.

11. The touchscreen amusement device of claim 4, wherein the coin acceptor includes a coin bucket located behind the display housing.

12. The touchscreen amusement device of claim 8, wherein the coin acceptor includes a coin bucket located behind the display housing.

13. A flatscreen touchscreen table-top amusement device comprising:
   a display housing having a front, a rear, a top edge and a bottom edge, the display housing being receivable and supportable by a rear-mounted support stand;
   a flatscreen touchscreen display disposed within the display housing, the flatscreen touchscreen display providing a reduced depth flatscreen display;
   an amusement device controller disposed within the display housing, the amusement device controller being coupled to the touchscreen display and being configured to display and control at least one of electronic games, music, video and multi-media applications using the touchscreen display; and
   the rear-mounted support stand configured to receive and support the display housing, the rear mounted support stand configured to receive a revenue system, at least a portion of the revenue system being located behind the display housing between the top edge and the bottom edge of the display housing, the display housing having a permanently fixed orientation relative to the rear-mounted support stand.

* * * * *